US00RE40970E

(19) United States
(12) Reissued Patent
Forster et al.

(10) Patent Number: US RE40,970 E
(45) Date of Reissued Patent: Nov. 17, 2009

(54) WIRELESS COMMUNICATION DEVICE ATTACHMENT AND DETACHMENT DEVICE AND METHOD

(76) Inventors: Ian J. Forster, 31 Great Cob, Chelmsford, Essex (GB), CM1 6LA; Patrick F. King, 4 Wingfoot Ct., Simpsonville, SC (US) 29680-6604

(21) Appl. No.: 11/273,726

(22) Filed: Nov. 14, 2005

Related U.S. Patent Documents

Reissue of:
(64) Patent No.: 6,646,555
Issued: Nov. 11, 2003
Appl. No.: 09/618,506
Filed: Jul. 18, 2000

U.S. Applications:
(63) Continuation of application No. 11/427,329, filed on Jun. 28, 2006, now abandoned.

(51) Int. Cl.
*G08B 13/14* (2006.01)

(52) U.S. Cl. ..... 340/572.8; 340/572.9; 340/693.9; 340/572.1; 702/188; 24/303; 40/1.5; 40/124.04; 40/661.01; 455/346; 455/348; 455/351; 455/90.3; 455/575.1

(58) Field of Classification Search .... 340/572.1–572.9, 340/693.9; 702/188; 24/303; 40/1.5, 124.04, 40/661.04; 455/346, 348, 351, 90.3, 575.1
See application file for complete search history.

(56) References Cited

U.S. PATENT DOCUMENTS

| | | | | |
|---|---|---|---|---|
| 2,297,806 | A | * 10/1942 | Smith | 211/69.1 |
| 3,911,534 | A | 10/1975 | Martens | |
| 3,947,930 | A | 4/1976 | Martens | |
| 3,974,581 | A | 8/1976 | Martens | |
| 4,184,277 | A | 1/1980 | Larin | |
| 4,510,489 | A | 4/1985 | Anderson, III | |
| 4,510,490 | A | 4/1985 | Anderson, III | |
| 4,527,153 | A | 7/1985 | Suzuki | |
| 4,540,980 | A | 9/1985 | Porco | |
| 4,754,532 | A | 7/1988 | Thomson | |
| 4,856,088 | A | 8/1989 | Oliwa | |
| 4,993,245 | A | 2/1991 | Ott | |
| 5,121,098 | A | 6/1992 | Chen | |
| 5,142,497 | A | 8/1992 | Warrow | |
| 5,285,127 | A | 2/1994 | Egley | |

(Continued)

FOREIGN PATENT DOCUMENTS

| | | |
|---|---|---|
| JP | 09-210799 | 8/1997 |
| JP | 09-245254 | 9/1997 |
| WO | 98/44477 A1 | 10/1998 |

OTHER PUBLICATIONS

International Search Report dated Jan. 30, 2002, issued in corresponding Application No. PCT/GB01/03222, filed Jul. 17, 2001.

*Primary Examiner*—Benjamin C. Lee
(74) *Attorney, Agent, or Firm*—Christensen O'Connor Johnson Kindness PLLC

(57) ABSTRACT

The invention relates to a wireless communication device that attaches using magnetic force in whole or part to an article of manufacture, or other material having a magnetic surface portion. The wireless communication device contains a form of a magnet to provide magnetic force and attraction. A magnet can be a natural magnet, electromagnet or other type of material having magnetic properties. The wireless communication device may be detached from the article by altering the magnetic force created by its associated magnet. Altering is accomplished by using an external device or a device internal to the wireless communication device. The wireless communication device is also operable to receive and communicate information regarding the article to which it is attached remotely for identification, informative, and tracking purposes.

59 Claims, 11 Drawing Sheets

U.S. PATENT DOCUMENTS

| | | | | |
|---|---|---|---|---|
| 5,347,733 | A | | 9/1994 | Whittington |
| 5,357,240 | A | | 10/1994 | Sanford |
| 5,376,921 | A | | 12/1994 | Trikilis |
| 5,552,655 | A | | 9/1996 | Stokes |
| 5,584,070 | A | | 12/1996 | Harris et al. |
| 5,585,953 | A | | 12/1996 | Zavrel |
| 5,611,120 | A | | 3/1997 | Riceman |
| 5,633,626 | A | | 5/1997 | Cawthorne |
| 5,706,332 | A | * | 1/1998 | Nagai ..... 455/575.3 |
| 5,712,899 | A | | 1/1998 | Pace, II |
| 5,732,451 | A | | 3/1998 | Mars |
| 5,826,450 | A | | 10/1998 | Lerchner |
| 5,833,603 | A | | 11/1998 | Kovacs |
| 5,854,994 | A | | 12/1998 | Canada et al. |
| 5,856,782 | A | | 1/1999 | Sasagawa |
| 5,881,846 | A | | 3/1999 | French |
| 5,937,487 | A | | 8/1999 | Bauer |
| 5,942,978 | A | | 8/1999 | Shafer |
| 5,955,951 | A | | 9/1999 | Wischerop |
| 5,982,282 | A | | 11/1999 | Ryan, Jr. |
| 5,990,794 | A | | 11/1999 | Alicot |
| 5,999,098 | A | | 12/1999 | Lian |
| 6,005,482 | A | | 12/1999 | Moran et al. |
| 6,007,086 | A | | 12/1999 | Hopkins |
| 6,012,415 | A | | 1/2000 | Linseth |
| 6,018,298 | A | | 1/2000 | Endo |
| 6,023,244 | A | | 2/2000 | Snygg |
| 6,078,259 | A | | 6/2000 | Brady |
| 6,100,804 | A | | 8/2000 | Brady |

* cited by examiner

WIRELESS COMMUNICATION DEVICE ATTACHMENT AND DETACHMENT DEVICE AND METHOD

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,646,555. The reissue applications are (1) the current application (11/273,726) and (2) U.S. patent application Ser. No. 11/427,329, filed Jun. 28, 2006, now abandoned, which was a continuation of the current application (11/273,726).*

FIELD OF THE INVENTION

The present invention relates to a wireless communication device that uses magnetic force in whole or part to attach itself to an article. Alternation of the magnetic force in whole or part detaches the wireless communication device from the article.

BACKGROUND OF THE INVENTION

Wireless communication devices are attached to articles of manufacture to wirelessly communicate identification, tracking and other information concerning the article. Many of the wireless communication devices used to attach to an article are radio frequency devices. Such wireless communication device is attached to articles so that information may be received and communicated to and from the articles. These devices are attached to articles when information is needed, and the devices are detached when information is no longer needed concerning the original articles so that the devices may be reused on other articles of interest.

One common type of wireless communication device used for attachment to articles of manufacture is called a transponder tag. For example, many clothing retailers attach transponder tags to clothing for security purposes. The transponder tags are adapted to interact with a signal that is transmitted by a transmitter into a surveillance zone. If the transponder tag moves through the surveillance zone, a system identifies the unauthorized presence of the tagged article in the zone.

These transponder tags are typically attached by mechanical components. Authorized persons detach the transponder tag when the article is presented for purchase. To detach the tags, a external tool or device is used. Some tools involve use purely mechanical removal methods. Other tools contain magnetic devices that function to move internal mechanical components of the transponder tag that are keeping the tag attached to the article.

Thus, existing methods lack automation for attachment and detachment of wireless communication devices. For example, some transponders require a tool using mechanical methods and movements to detach the transponder from an article. Others require reception of a special signal before detachment is allowed of the communication device. Still others use an external tool for detaching that contains an electromagnet, but the electromagnetic only aids in the movement of internal mechanical parts in the transponder tag. The electromagnet only aids in the detachment process and does not in and by itself detach the transponder tag from the article. Alteration of magnetic force for detachment of wireless communication deivces is not used most likely, because the articles are usually not magnetic and thus, it is not possible to create a sufficient readily magnetic force between the wireless communication devices and the articles is not substantially possible.

SUMMARY OF THE INVENTION

The present invention relates to a wireless communication device for attachment to and detachment from articles having a magnetic magnetic surface portion so as to enable for wireless communication of tracking, identification and other information between the article and another location. In one embodiment, the magnetic surface portion is a conductive material. In another embodiment, the magnetic surface portion is a non-conductive material. The wireless communication device contains a magnet with magnetic attraction properties so that magnetic force can be used in whole or part to attach the wireless communication device to a magnetic surface portion of the article. To detach the wireless communication device from the article, the magnetic force is altered in the form of cancelling, disabling or altering the force so that the wireless communication device no longer has sufficient attractive force to the magnetic surface portion to overcome the gravitational pull of the earth.

The wireless communication device contains an antenna, a control system, wireless communication electronics, and a magnet in its most basic form. The antenna receives and communicates signals to and from the wireless communication device. The wireless communication electronics is adapted to communicate and receive communication signals to and from the antenna. Receive communication signals are interpreted by the control system, and the control system sends out signal to be communicated by the wireless communication device to the wireless communication electronics. The magnet has a magnetic force that attaches to a magnetic surface portion of the article when the wireless communication device is in close proximity to the magnetic surface portion.

The magnet may be a natural magnet, electromagnet, or other type of material having magnetic properties that creates a magnetic force. An electromagnet may be comprised of a coil wound around a conductive core, such as metal or steel, whereby the control system provides a voltage across said coil from its power source to run a current through the magnetic surface portion, thereby creating an electromagnet. The wireless communication device may contain its own power source, such as a battery or reservoir capacitor, or may use communications received from an interrogation reader.

The magnet may be located inside the wireless communication device or may be located proximate to the wireless communication device and attached to the wireless communication device.

One embodiment locates the magnet inside a chamber comprised of two core pieces coming together around a housing having a magnet and forming two gaps at opposite ends. The magnet is free to rotate inside the chamber. In one orientation, the magnet is substantially perpendicular to the magnetic surface portion of an article and emanates magnetic flux into the core pieces, providing them with a sufficient magnetic force to cause an attraction between the wireless communication device and the magnetic surface portion. Detachment is accomplished by rotating the magnet to a position that is substantially parallel to the magnetic surface portion, thereby causing the magnetic flux to be emanated in the gaps and sufficiently reducing the magnetic force in the core pieces so as to detach the wireless communication device.

In another embodiment, the wireless communication device is located inside the core pieces and is either located near the gap or away from the gap. If located near the gap, the presence of magnetic flux indicates that the wireless communication device is not attached to a magnetic surface portion of an article. If located away from the gap, the presence of magnetic flux indicates that the wireless communication device may be attached to a magnetic surface portion. In another embodiment, two separate wireless communication devices may be located in each core piece so that one can be located near the gap and the other away from the gap. In this manner, only one wireless communication device should sense magnetic flux at a given time and the sensing of magnetic flux by one of the wireless communication devices. The status of whether or not the wireless communication device is attached or detached from a magnetic surface portion may be communicated wirelessly.

The housing having a magnet may be rotated in a number of manners. One embodiment uses a spring and latch combination. A latch is placed in a notch in the housing that maintains the housing and the magnet in an orientation that keeps the wireless communication device attached to the magnetic surface portion of an article. When the latch is released, the energy stored in the spring causes the housing to rotate the magnet in an orientation so as to detach the wireless communication device from the magnetic surface portion.

In a different embodiment, a mechanical resonator, or other device that responds to particular resonant frequency, is used to rotate the magnet to detach the wireless communication device from the magnetic surface portion of an article. An external device may be used to generate the resonate frequency or the control system of the wireless communication device may be adapted to generate such frequency upon receipt of a communication command. The wireless communication device contains a frequency generator that may also generate the resonant frequency to detach the wireless communication device from the magnetic surface portion. This can occur if the control system receives a command to detach.

In another embodiment, the wireless communication device may contain a piezoelectric device that is powered from the power source by the control system to generate a mechanical force to release the latch, thereby detaching the wireless communication device from the magnetic surface portion.

In another embodiment, the chamber has an open portion for an external device to be inserted inside said chamber proximate to the magnet. The magnet is oriented such that its magnetic flux extends out to the magnetic surface portion, creating an attraction between it and the wireless communication device. The insertion of such a magnetic shorting material causes the magnet to reverse polarity, thereby causing the magnetic flux to extend in a direction substantially parallel to the magnetic surface portion such that an attraction sufficient to keep the wireless communication device attached to the magnetic surface portion is not longer present.

In another embodiment, the magnet is located in a chamber and does not rotate. The magnetic can move in a direction perpendicular to the magnetic surface portion, but does not change its polarity. In an attached state, the magnet is located on the side of the chamber nearest the magnetic surface portion such that its magnetic flux emanates into the magnetic surface portion to create the attraction. To detach the wireless communication device, an external device having magnetic properties is brought into proximity to the chamber to attract the magnet to the opposite end of the chamber that is farthest from the magnetic surface portion. This causes the magnet's magnetic flux to move further from the magnetic surface portion such that the amount of flux emanating into the magnetic surface proton is no longer sufficient to create an attraction that is strong enough to keep the wireless communication device attached to the magnetic surface portion of the article.

In another embodiment, the wireless communication device contains conductive tabs that form an antenna. The antenna is a slot antenna if the tabs are attached across a slot in a magnetic surface portion of an article. The antenna is a pole antenna if the tabs are not attached across such a slot. In one embodiment, the tabs are permanent magnets that emanates magnetic flux to attract the wireless communication device to the magnetic surface portion of the article that is also magnetic. To detach, either as external device or an electromagnet inside the wireless communication device alters the magnetic flux.

In another embodiment, the wireless communication device alters the magnetic force to detach the wireless communication device from the magnetic surface portion by generating a magnetic force sufficient to alter or cancel the magnetic force created by the magnet. The wireless communication device may contain a core with a coil wound around if such that the control system can place a voltage across the coil, using power from the power source to create an electromagnet having a magnetic force sufficient to alter the magnetic force created by the magnet associated with the wireless communication device so as to detach the wireless communication device.

In another embodiment, the wireless communication device contains an electromagnet for use as the magnetic force to attach the wireless communication device to the magnetic surface portion of an article. One embodiment has an electromagnet that is created by a core with a coil wound amount it. The control system places a voltage across the coil using power from the power source to create an electromagnet having a magnetic force sufficient to attract the wireless communication device to the magnetic surface portion. To detach the wireless communication device from the magnetic surface portion, the control system disables power from the core so that the core is no longer an electromagnet.

In another embodiment, tabs connected to the wireless communication device form electromagnets. The tabs are core material with a coil would around them. The wireless communication device runs a current through the coil to cause the tabs to function as be an electromagnet and, thus, attach the wireless communication device by magnetic force to a magnetic surface portion of an article. To detach itself from the magnetic surface portion, the wireless communication device disconnects the current to the coils.

The wireless communication device may use, as part of its force to attach to a magnetic surface portion, a non-magnetic force in addition to a magnetic force. When the magnetic force is altered, the non-magnetic force is insufficient alone to keep the wireless communication device attached to the magnetic surface portion.

DETAILED DESCRIPTION OF THE INVENTION

Figure 1:
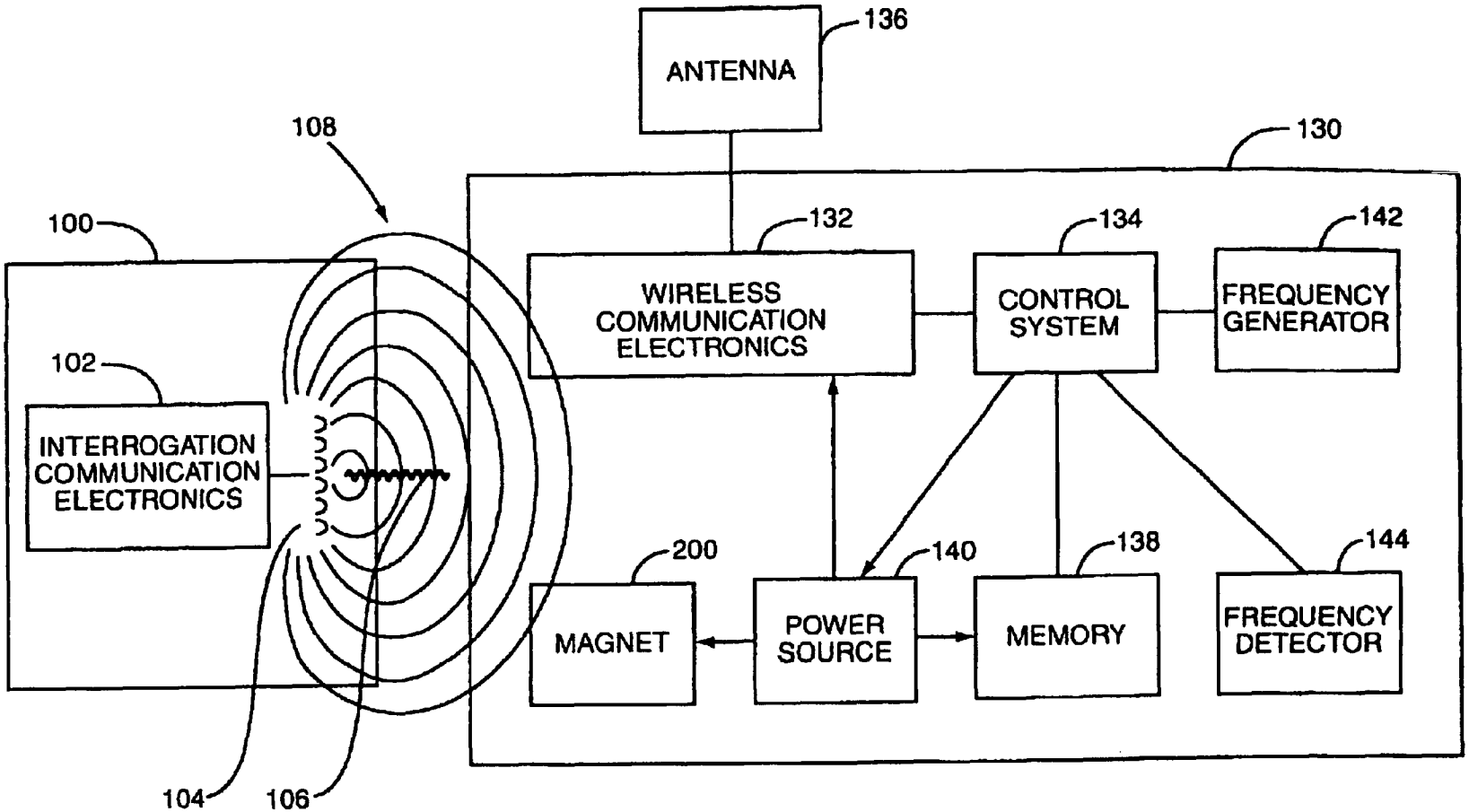
FIG. 1 is a schematic diagram of a wireless communication device.

Referring now to the drawings in general, and to FIG. 1 in particular, it will be understood that the illustrations are for the purpose of describing specific embodiments of the present invention and are not intended to limit the invention thereto. A wireless communication device 130 is connected or attached to a device or article of manufacture or other material to communicate information electronically and wirelessly concerning the device, article of manufacture or other material. The word "attach," as used herein is intended to mean physically attach, couple or other force sufficient for wireless communication device 130 to come in contact directly with magnetic surface portion 162 or to a material that is attached to magnetic surface portion 162, and the present invention should not be limited to any particular narrower meaning.

One embodiment of the present invention uses a specific type of wireless communication device 130 called a radio frequency transponder. Herein, "transponder" is used interchangeably for "wireless communication device" 130; however, the present invention is not limited to a transponder as the wireless communication device 130. Some wireless communications devices 130, such as that described in U.S. Pat. No. 5,585,953, entitled "IR/RF radio transceiver and method," incorporated herein by reference in its entirety, have both transmit and receive capability and can be used in the present invention. Other wireless communication devices 130 have receive capability and use the energy received to communicate back, such as described in U.S. Pat. No. 6,078,259 entitled "Radio frequency identification tag," incorporated herein by reference in its entirety. The wireless communication device 130 in the present invention can be any type of device that allows reception of wireless, electronic communications and is able to communicate in response thereto.

The transponder 130 is usually made out of plastic or other hardened material and comprises a control system 134, wireless communication electronics 132, antenna 136, and memory 138. The antenna 136 may be either external or incorporated internal to the transponder 130.

The wireless communication electronics 132 receives information wirelessly that is received by the antenna 136. The wireless communication electronics 132 assimilates the received information and communicates it to the control system 134. The control system 134 receives this information and controls the operation of the transponder 130. In one embodiment, the control system 134 is an integrated circuit or other type of microprocessor or micro-controller electronics that controls the operations of the transponder 130. The control system 134 is connected to the wireless communication electronics 132 to communicate and receive transmissions. The control system 134 is also connected to memory 138 for storing and retrieving information. The control system 134 may additionally be connected to a frequency generator 142 and frequency detector 144 to use in communicating and altering the magnetic field to detach the wireless communication device 130, as discussed below and later in this description.

The transponder 130 also contains a magnet 200 to aid in the transponder's 130 attachment to the magnetic surface portion of an article. The magnetic surface portion may be a conductive material or may be a non-conductive material. The transponder 130 may also contain its own power source 140, such as a battery or reservoir capacitor, for needed power to carry out operations within the transponder 130 that are discussed later.

FIG. 1 also depicts how communication is achieved with the transponder 130. An interrogation reader 100 contains interrogation communication electronics 102 and an interrogation antenna 104. The interrogation reader 100 communicates to the transponder 130 by emitting an electronic signal or command modulated in a signal 106 through the interrogation antenna 104. The interrogation antenna 104 may be any type of antenna that can radiate the modulated signal 106 through a field 108 so that a compatible device such as a transponder 130 can receive such signal 106 through its own antenna 136. The field 108 could be any of a variety of different types used in electronic communications including electromagnetic, magnetic, or electric. The signal 106 is a message containing information and/or specific instructions for the transponder 130.

When the transponder antenna 136 is in the presence of the field 108 emitted by the interrogation antenna 104, the wireless communication electronics 132 are energized, thereby energizing the transponder 130. The transponder 130 remains energized so long as its antenna 136 is in the field 108 of the interrogation reader 100. The wireless communication electronics 130 demodulates the signal 106 and sends a message containing information and/or specific instructions to the control system 134 for appropriate actions. For example, the request in the message may be for the transponder 130 to send back information stored in memory 138 about the article to which the transponder 130 is attached, including, but not necessarily limited to its date of manufacture, place of manufacture, and type or other distinguishing characteristic of the article. The transponder 130 communicates information to the interrogation reader 100 by altering the contents of the signal 106 in its return path to the interrogation reader 100.

Alternative forms exist for communicating with a wireless communication device 130. For instance, the wireless communication device 130 may have a transmitter so that it can send information to a remote source without having to use he signal 106 return as the means for communication. The wireless communication device 130 may contain its own power source 140 if it transmits information separately from its reception. It is understood to one of ordinary skill in the art that there are many other manners to provide a wireless communication device 130 to communicate wirelessly for use with the present invention, such as a transponder 130, and that the present invention includes but is not limited to the particular manners described above.

Figure 2:
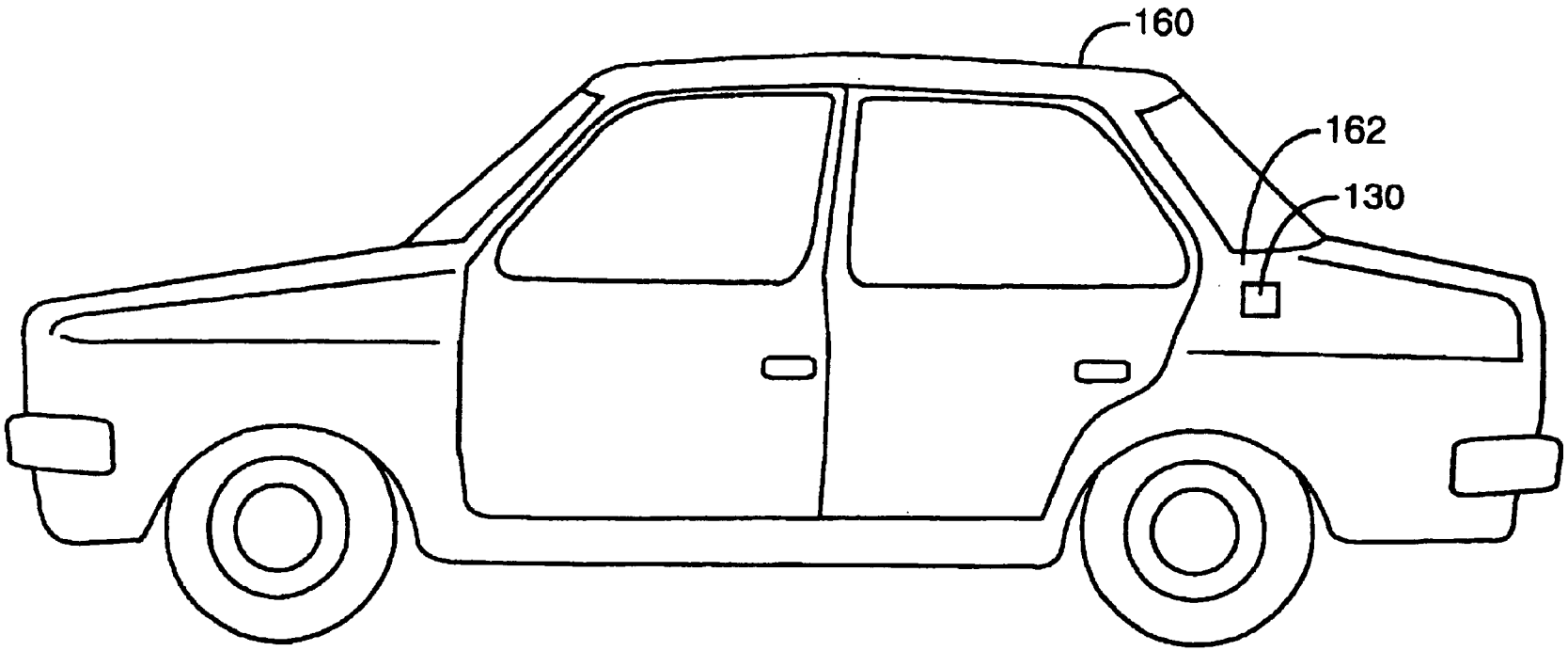
FIG. 2 is a diagram of a wireless communication device attached to a magnetic surface portion of an automobile.

FIG. 2 illustrates a particular embodiment of the transponder 130 attached to a particular article or article of manufacture; an automobile 160. The transponder 130 is mounted to a magnetic surface portion 162 of the automobile 160 using magnetic force for attraction. The magnet 200 associated with the transponder 130 contains an attractive force that causes the wireless communication device 130 to attract to and attach to the magnetic surface portion 162 of the automobile.

The transponder 130, through use of a magnet 200, attaches to an article so that the information concerning the article can be communicated wirelessly. For instance, the location of the automobile 160 may be trackable through use of the transponder 130 if the transponder 130 contains an identifying means, such as a number, relating to the particular automobile 160 to which the transponder 130 is attached. Additional information concerning the article, or automobile 160 in this particular embodiment, including its make, model, etc., can be communicated and/or tracked wirelessly.

Figure 3:
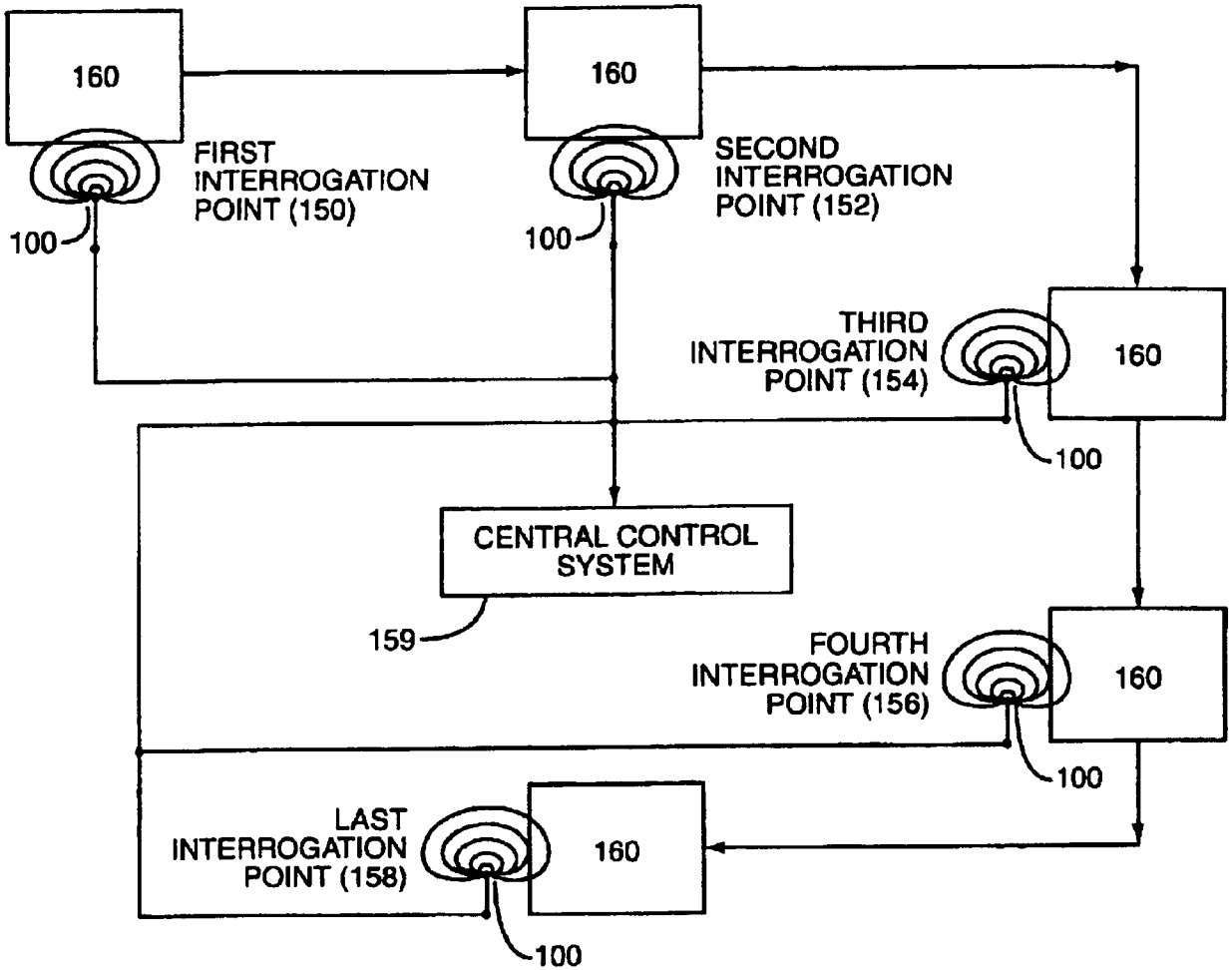
FIG. 3 is a schematic diagram of a tracking and information system.

FIG. 3 illustrates one type of tracking system whereby the transponder 130 attached to articles 160 can be tracked through an environment such as factory, distribution facility or storage facility. For example, the transponder 130 connected to article 160 passes a first interrogation point 150 that includes an interrogation reader 100. When the article 160 and its attached transponder 130 are in the presence of the interrogation reader 100 as described previously, a message containing information and/or a specific request for information may be transmitted by the interrogation reader 100 and received by the transponder 130. This process continues as the automobile 160 moves to a second interrogation point 152, a third interrogation point 154, a fourth interrogation point 156, and on to a last interrogation point 158.

A central control system 159 maintains the information from interrogation readers 100 and monitors the movement of the articles 160 through the facility. The information received by each of the interrogation readers 100 may be forwarded to the central control system 159 in a variety of architectures such as parallel or serial communication or through use of a local area network (LAN) or wide area network (WAN). Such architecture may include wiring between the interrogation readers 100 and the central control system 159 or may be wireless communication. The central control system 159 may also send information to the interrogation reader 100 to be transmitted back to the transponder 130 attached to the article 160 for a variety of purposes including for identification. The central control system 159 racks the location of the articles 160 and may be alerted if it expects to receive information about a particular article 160 and does not if the central control system 159 is designed to have knowledge of anticipated or expected whereabouts of the articles 160.

Note that wireless communication devices 130 having their own transmission capability may still be used for tracking and communicating information concerning articles 160 without the use of interrogation readers 100. In its simplest form, a receiver to receive communication from the wireless communication device 130 would be needed. If the system tracks and/or receives information from more than one wireless communication device 130, the system may need to have the ability to receive and transmit on different frequencies in order to distinguish wireless communication devices 130. However, as identification stored in memory 138 of the transponder 130 may also be used to distinguish wireless communication deivces 130. During commissioning of each transponder 130, it may be necessary to place the transponder in range of an interrogation reader 100 in order to erase previously stored information in memory 138 or to store particular data or configuration information about the article 160 in memory 138 for later use.

The use of magnetic force allows the transponder 130 to be attached and detached easily from an article 160. Magnetic force may be created by magnetic flux such as one that emanates from a natural magnet or a magnetic field such as one created by an electromagnet. An amount of force necessary for the transponder's 130 weight to overcome the gravitational pull of the earth is necessary for the transponder 130 to attach to an article 160. The present invention can use the magnet 200 to create a magnetic force sufficient by itself to create the necessary attractive force between the transponder 130 and the article 160 for attachment, or can use magnetic force in part coupled with some other electronic or mechanical force to create the necessary magnetic force between the transponder 130 and the article 160 for attachment.

Figure 4A:
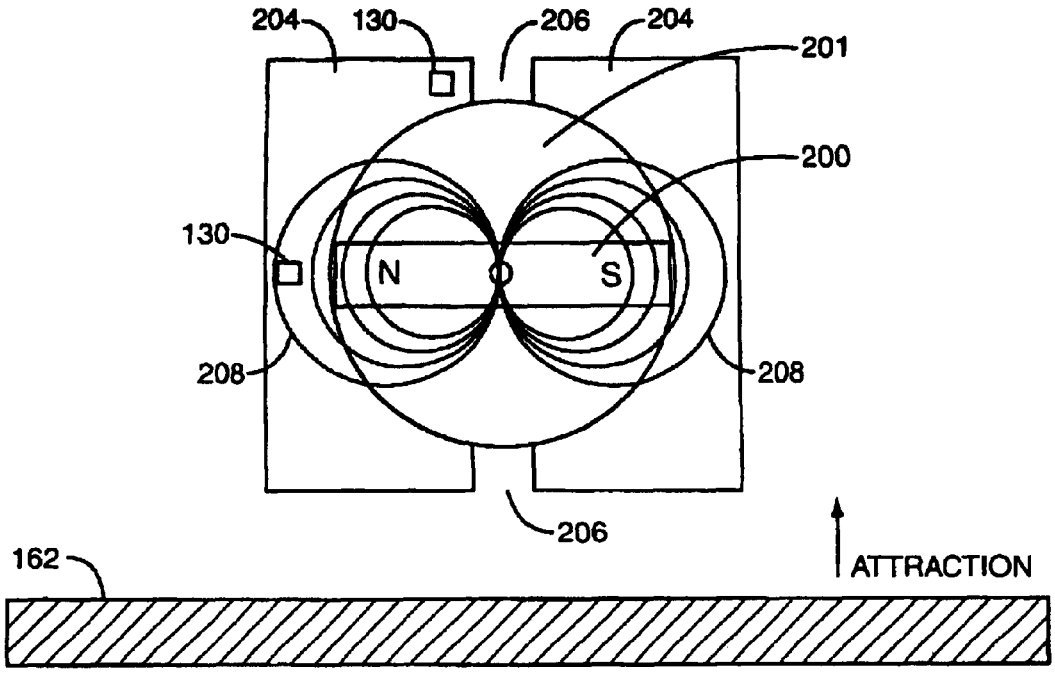
FIG. 4A is a schematic diagram of a magnet chamber containing a rotating magnet positioned to create an attraction.
Figure 4B:
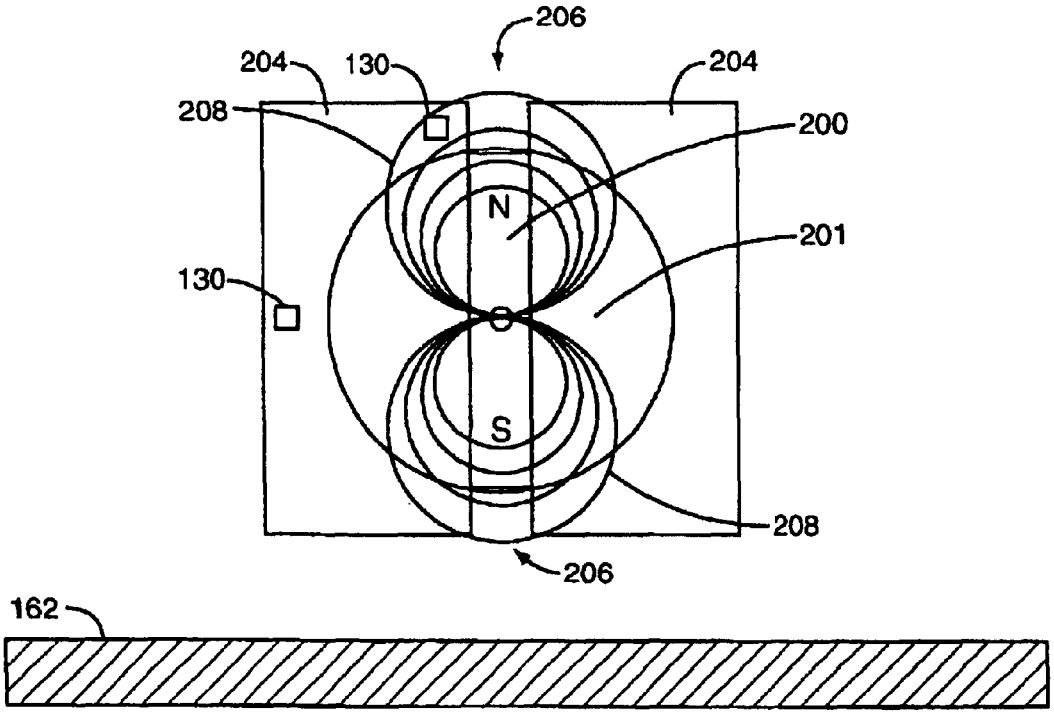
FIG. 4B is a schematic diagram of a magnet chamber containing a rotating magnet positioned to not create an attraction.

FIGS. 4A and 4B illustrate one embodiment of attaching and detaching a wireless communication device 130 to a magnetic surface portion 162 by altering the magnetic flux 208 created by a magnet 200. Pole pieces 204 made of steel or other conductive material are provided that are attached to a wireless communication device 130. The pole pieces 204 have semicircles on one side, and are attached together such that their respective semicircles face each other. The pole pieces 204 do not come completed together; gaps 206 are left at each end of the pole pieces 204. A housing 201 connects the pole pieces 204 together. The pole pieces 204 are designed such that a magnet 200 inside a housing 201 can rotate inside the pole pieces 204. The magnet 200 and the magnetic flux 208 from the magnet 200 cause the pole pieces 204 to become magnetized if the magnet 200 is oriented such that the magnetic flux 208 does not emanate into the gaps 206. If the pole pieces 204 are magnetized, the pole pieces 204 will be attached to a surface such as a magnetic surface portion 162 of an article 160, thereby causing the wireless communication device 130 to attach to the magnetic surface portion 162 of the article 160.

One embodiment of the present invention uses a magnet 200 that is a permanent magnet. The orientation of the magnet 200 is controlled to create a magnetic attraction between the wireless communication device 130 and the article 160. FIG. 4A illustrates an orientation of the magnet 200 whereby the pole pieces 204 are magnetized by the magnetic flux 208 from the magnet 200. The magnet 200 is a rectangular shape and is oriented substantially horizontally with its north and south poles facing the semicircles of the pole pieces 204. The pole pieces 204 are a square type cylinder shape, but other shapes such as a round cylinder or a shape such as that shown in FIGS. 5A and 5B can be used. The only requirement is that the magnet 200 be able to rotate inside the pole pieces 204. The magnetic flux 208 emanates from the magnet 200 in two directions around the north and south poles as shown. The magnetic flux 208 thereby magnetizes the pole pieces 204, thereby causing a magnetic attraction between the pole pieces 204 and the magnetic surface portion 162.

FIG. 4B illustrates an orientation of the magnet 200 whereby the pole pieces 204 are not magnetized by the magnetic flux 208 from the magnet 200. The magnet 200 is oriented substantially vertically with its north and south poles facing the gaps 206. The magnetic flux 208 emanates from the magnet 200 in two directions around the north and south poles as shown. A large portion of the magnetic flux 208 emanate into the gaps 206, thereby not magnetizing the pole pieces 204 and causing a magnetic attraction between the pole pieces 204 and the magnetic surface portion 162.

Figure 5A:
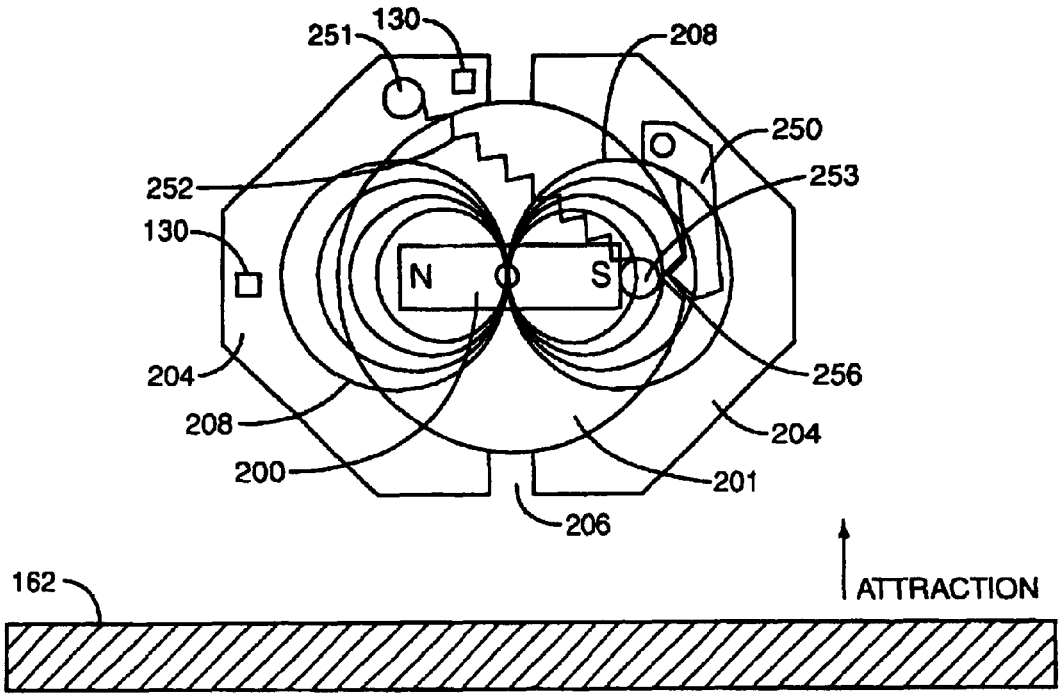
FIG. 5A is a schematic diagram of a latch and spring combination coupled to a rotating magnet positioned so as not to create an attraction.
Figure 5B:
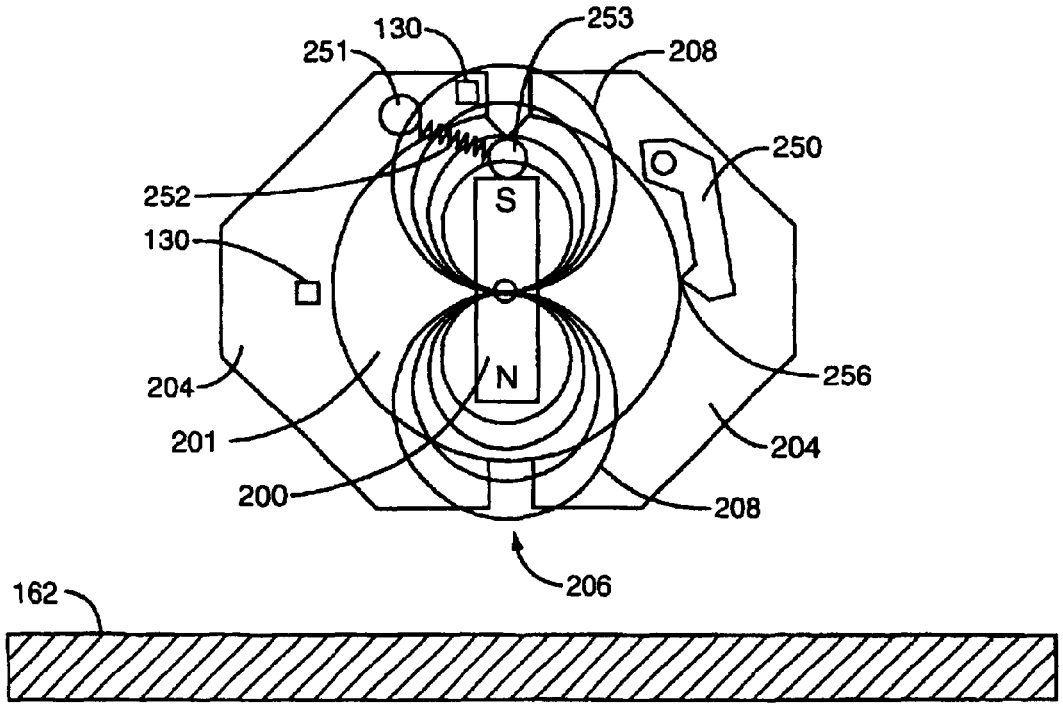
FIG. 5B is a schematic diagram of a latch and spring combination coupled to a rotating magnet positioned to create an attraction.

FIGS. 5A and 5B show one embodiment of controlling the orientation of the magnet 200 illustrated in FIGS. 4A and 4B. The pole pieces 204 in FIGS. 5A and 5B are of slightly different shape, but this and the shape of the housing 201 is of no consequence in the present invention so long as the magnet 200 can rotate inside the pole pieces 204. The magnet 200 is located in the hollow portion created by the pole pieces 204 as previously described. A spring mechanism 252 is provided that is attached at a point 251 on one of the pole pieces 204 and another point 253 on the housing 201.

As illustrated in FIG. 5A, the housing 201 has a notch 256 that is designed to couple and be held in position with a mechanical latch 250 with a spring 252 connected between points 251, 253 and elongated with energy stored inside the spring 252. The magnet 200 is in the horizontal orientation as described earlier, whereby the magnetic flux 208 magnetizes the core pieces 204 so that the wireless communication device 130 is attracted to the magnetic surface portion 162. As illustrated in FIG. 5B, the latch 250 is released to alter the magnetic flux 208 to detach the wireless communication device 130 from the magnetic surface portion 162. Release of the latch 250 from the notch 256 causes the spring mechanism 252 to release its stored energy and return to a shortened length, thereby causing the housing 201 containing the magnet 200 to rotate to an ordination where the magnetic flux 208 emanates in the gaps 206 and does not magnetize the core pieces 204 either at all or enough to create a magnetic force sufficient to create an attraction storing enough to attach the wireless communication device 130 to the magnetic surface portion 162.

A magnetic latch 250 may be also used to rotate the housing 201 such as that described in U.S. Pat. No. 5,611, 120 entitled "Magnetic latch" and all patents and materials cited in U.S. Pat. No. 5,611,120 all incorporated herein by reference in their entirety. The magnetic latch 250 is released in response to an external magnetic field generated by an external device that is brought into proximity to the magnetic latch 250. The magnetic field may be of less strength than needed to cancel the magnetic flux 208. This allows the external device to require less energy than that needed to entirely cancel the magnetic field.

Another type of latch 250 that may be used is a mechanical resonator. A mechanical resonator is a device that is responsive to a frequency signal such as that described in U.S. Pat. No. 5,285,127 entitled "Single mode resonator and method" incorporated herein by reference in its entirety. A mechanical resonator resonates at a particular frequency, thereby building up sufficient motion to release a latch 250. An external device that generates the resonate frequency of the mechanical resonator is brought into the proximity to the mechanical resonator. This external device could be an electromagnet or other device that is capable of generating the resonate frequency of the mechanical resonator. If the mechanical resonator resonates at 60 Hertz, the external electromagnet may be powered by a normal power outlet of 110 Volts, 60 Hertz. When the mechanical resonator resonates, it moves, thereby releasing the housing 201 allowing it to rotate to detach the wireless communication device 130 from the magnetic surface portion 162 as previously described.

Figure 6A:
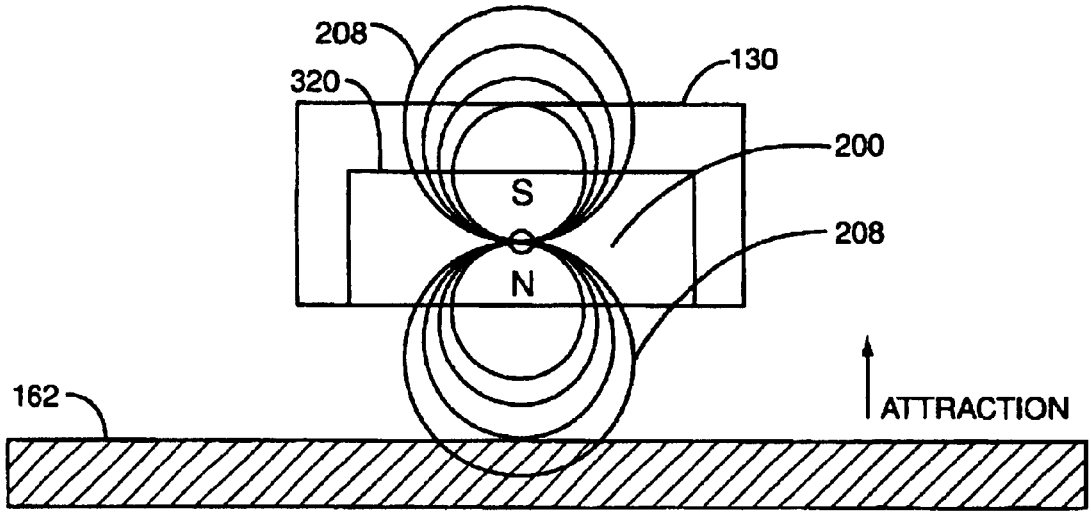
FIG. 6A is a schematic diagram of a magnet chamber containing a moving magnet positioned so as not to attach the wireless communication device to a magnetic surface portion.
Figure 6B:
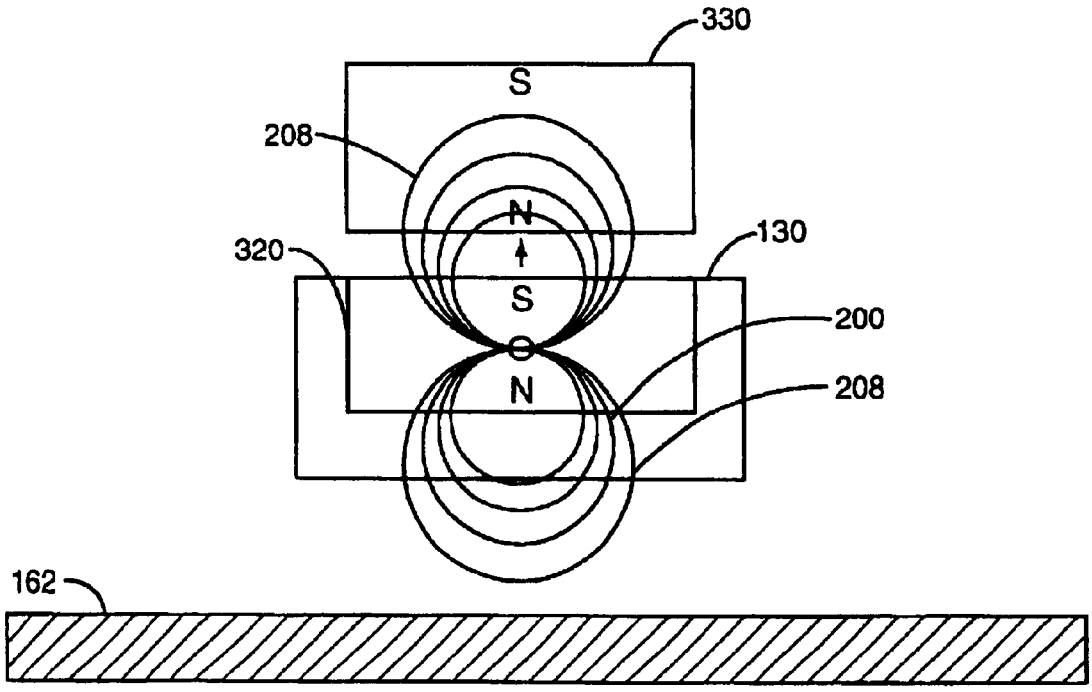
FIG. 6B is a schematic diagram of a magnet chamber containing a moving magnet positioned to detach the wireless communication device from a magnetic surface portion.

FIGS. 6A and 6B illustrate another embodiment of attaching and detaching a wireless communication device 130 to a magnetic surface portion 162 using magnetic force. This embodiment provides a magnet 200 that can be detached by altering its orientation, thereby causing the wireless communication device 130 to be attracted or not attracted magnetically to a magnetic surface portion 162 as desired. FIG. 6A illustrates a wireless communication device 130 that is attached to a magnetic surface portion 162. The wireless communication device 130 contains a chamber 320, and a magnet 200 is housed inside the chamber 320. The magnet 200 can move within the chamber 320, but is always oriented in the same manner such that its north and south poles do not rotate or change orientation. When the wireless communication device 130 is attached to the magnetic surface portion 162, the magnet 200 is placed at the end of the chamber 320 that is closest to the magnetic surface portion 162. The magnetic flux 208 emanating from the magnet 200 extends out and into the magnetic surface portion 162 thereby, causing a magnetic attraction between the magnet 200 and the magnetic surface portion 162. The wireless communication device 130 is attached to the magnetic surface portion 162 through use of magnetic force.

FIG. 6B illustrates detaching the wireless communication device 130 from the magnetic surface portion 162, as previously discussed in FIG. 6A, by alerting the magnetic flux 208. An external device called a tag remover 330 contains magnetic properties. The tag remover 330 is placed near the wireless communication device 130 in such a manner that it attracts the magnet 200 away from its location in the chamber 320 and away from the magnetic surface portion 162. When the magnet 200 is moved away from the magnetic surface portion 162, the magnetic flux 208 moves away from the magnetic surface portion 162 such that the magnet flux 208 between the wireless communication device 130 and the magnetic surface portion 162 is not sufficient to keep the wireless communication device 130 attached to the magnetic surface portion 162.

Figure 7A:
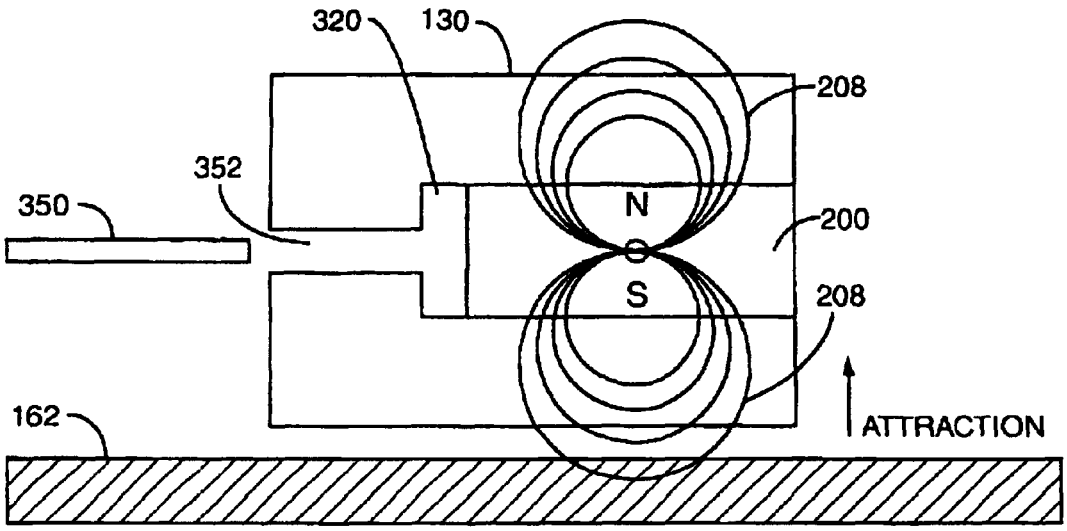
FIG. 7A is a schematic diagram of a magnet chamber containing a magnet and an opening for insertion of a magnetic shorting material.
Figure 7B:
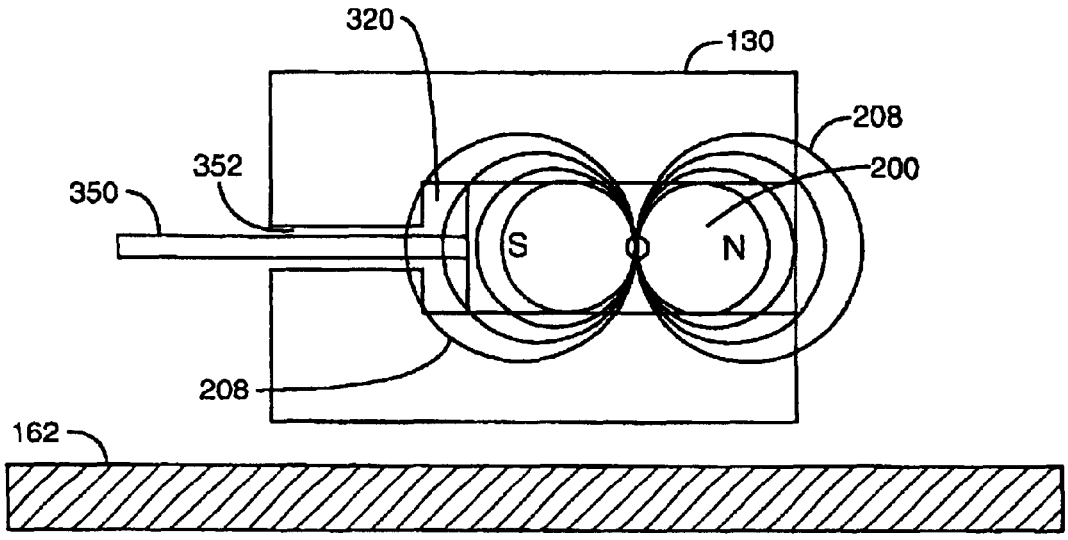
FIG. 7B is a schematic diagram of a magnet chamber containing a magnet and an opening and with a magnetic shorting material inserted through the opening into the chamber to detach the wireless communication device from a magnetic surface portion.

FIGS. 7A and 7B illustrate another embodiment of attaching and detaching wireless communication device 130 to a magnetic surface portion 162 using magnetic force. FIG. 7A illustrates a wireless communication device 130 that is attached to a magnetic surface portion 162. The wireless communication device 130 contains a chamber 320. The magnet 200 is a natural magnet that is housed in the chamber 320. The chamber 320 contains an opening 352 that allows a magnetic short 350 to be inserted into the chamber 320 and physically contact the magnet 200 as shown in FIG. 7A. The magnet's 200 north and south poles are in a direction whereby one pole is closer to the magnetic surface portion 162 than the other. The magnetic flux 208 emanating from the magnetic 200 creates a magnetic attraction between the magnet 200 and the magnetic surface portion 162 thereby causing the wireless communication device 130 to attach to the magnetic surface portion 162 using magnetic force. The magnet 200 either does not move in the chamber 320 or only moves in a direction that does not substantially affect the distance between the magnetic flux 208 and the magnetic surface portion 162.

As illustrated in FIG. 7B, the wireless communication device 130 is detached from the magnetic surface portion by altering the magnetic flux 208. A magnetic short 350 is inserted into the opening 352. The magnetic short 350 is a piece of material that causes magnet 200 to reverse its polarity when the magnetic short 350 and the magnet 200 are in physical contact with one another. When the magnetic short 350 contacts the magnet 200, the north and south poles of the magnet 200 are reversed in a plane perpendicular to the natural orientation and the magnetic flux 208 runs in a direction parallel to the magnetic surface portion 162. The wireless communication device 130 detaches from the magnetic surface portion 162 since the magnetic flux 208 is no longer sufficient to create an attraction between the magnet 200 and the magnetic surface portion 162.

Figure 8:
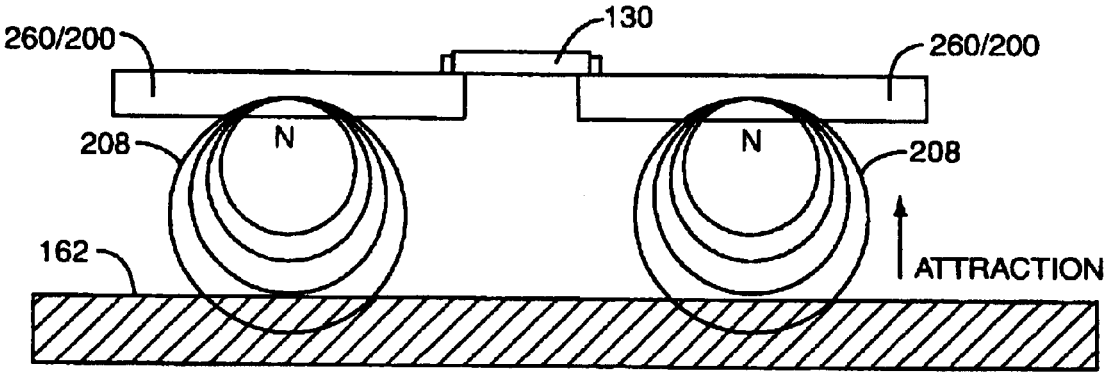
FIG. 8 is a schematic diagram of a wireless communication device having magnetic tabs.

FIG. 8 illustrates another embodiment of attaching and detaching a wireless communication device 130 to a magnetic surface portion 162 using magnetic force. The wireless communication device 130 in FIG. 8 contains conductive tabs 260 that form magnet 200. Tabs 260 are permanent magnets that attach to the wireless communication electronics 132 to form antenna 136. Tabs 260 serve to form both a pole antenna or slot antenna depending on the characteristics of magnetic surface portion 162. This particular construction of a wireless communication device 130 and is desirability to use for applications, which are also applicable to the present invention, are described in more detail in Pending patent application Ser. No. 09/618,505, entitled "Wireless Communication Device and Method," assigned to the same assignee as the present invention, and is incorporated herein by reference in its entirety.

Just as previously described above, tabs 100 emanate magnetic flux 208 that attracts tabs 260 to a magnetic surface portion 162. Such magnetic flux 208 may be the sole force to attach the wireless communication device 130 to magnetic surface portion 162, or may be a supplemental force in addition to mechanical or other type of force. The wireless communication device 130 is detached from magnetic surface portion 162 by altering the magnetic flux 208 emanated by tabs 260. This can be accomplished by bringing an external device in to proximity to the magnetic field exerted by tabs 100. An electromagnet, such as that described in FIG. 9 below, may also be used to alter the magnetic flux 208 of tabs 260 to cause the wireless communication device 130 to detach from magnetic surface portion 162.

Figure 9:
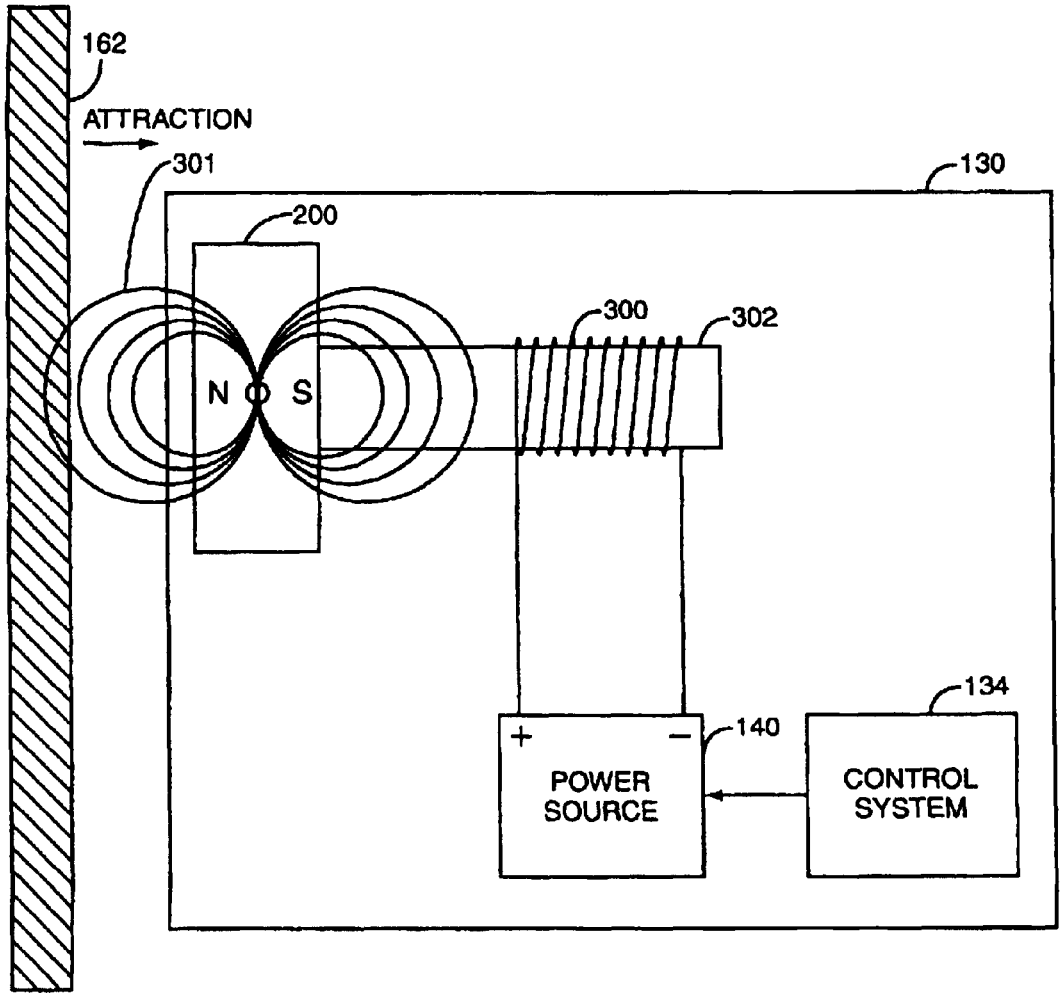
FIG. 9 is a schematic diagram of an electromagnet in a wireless communication device.

FIG. 9 illustrates an embodiment where an electromagnetic force is used to attach and detach the wireless communication device 130 to and from the magnetic surface portion 162. It is well known that a magnetic field 301 is created when current is run through a core 302, thereby creating an electromagnet. The control system 134 causes the power source 140 to apply a voltage to a coil 300 wound around a core 302 made out of a conductive material such as iron or steel. The voltage potential across the core 302 causes a current to run through a coil 300 wound around the core 302. This creates a magnetic field 301 around the core 302. The magnetic field 301 is substantially perpendicular to the magnetic surface portion 162. The wireless communication device 130 is attached to the magnetic surface portion 162 through the attraction caused by the magnetic field 301.

The wireless communication device 130 is detached from the magnetic surface portion 162 by altering the magnetic field 301. Included within the definition of altering is disabling or canceling. The magnetic field 301 may be altered by brining an external device into range of the wireless communication device 130 that alters the magnetic field 301. The magnetic field 301 may be also altered if the control system 140 detaches power from the power source 140 to the coil 300.

Figure 10:
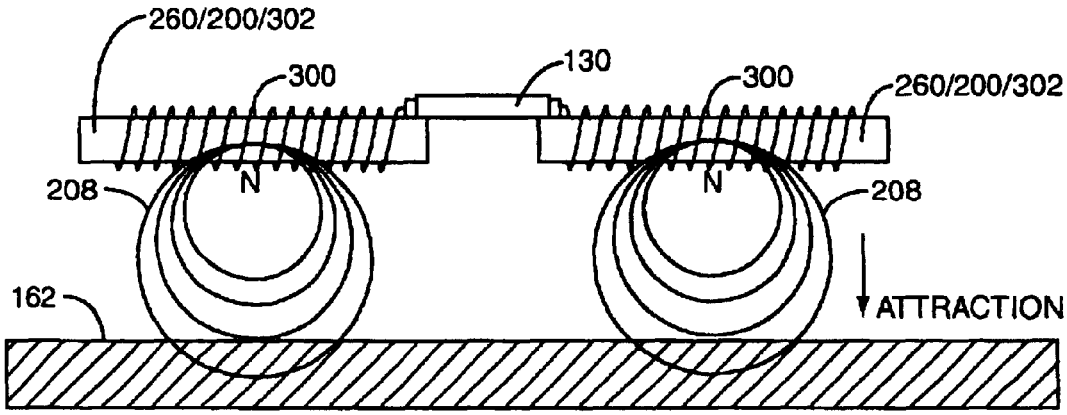
FIG. 10 is a schematic diagram of a wireless communication device having electromagnetic tabs.

FIG. 10 illustrates another embodiment of a wireless communication device 130 has tabs 260 just as illustrated in FIG. 8. Tabs 260 are electromagnets 200 instead of permanent magnets 200. Tabs 260 are constructed out of a conductive material and serve as the core 302, as described above for FIG. 9. Coil 300 is wrapped around tabs 260. The control system 134 is configured to run a current through coil 300 when desired including when requested by interrogation reader 100. The current causes the tabs 260 to become electromagnets thereby causing wireless communication device 130 to attract to magnetic surface portion 162. The wireless communication device 130 is detached from magnetic surface portion 162 when control system 134 disconnects current from the coils 300 just as described above for FIG. 9.

Figure 11:
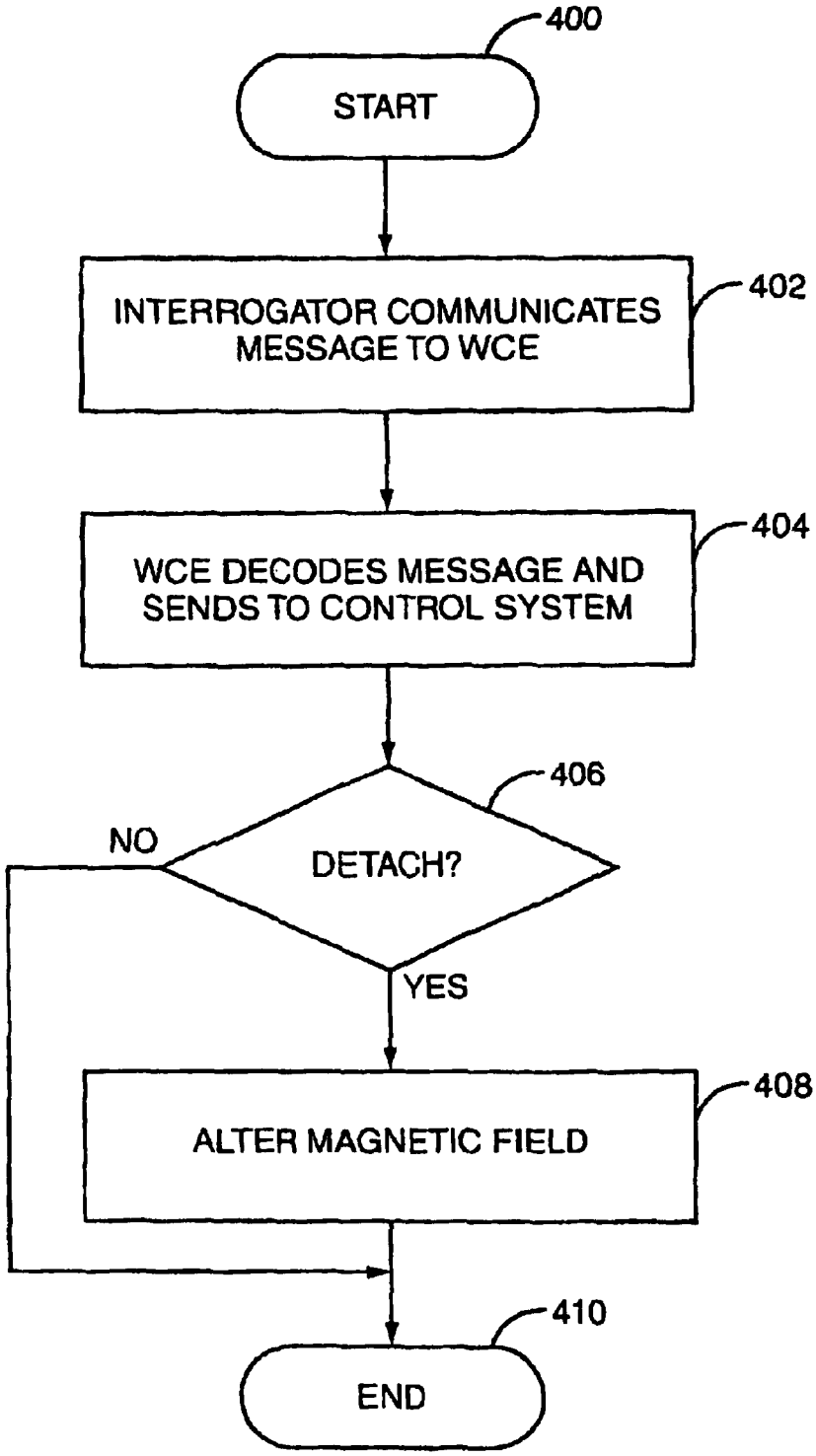
FIG. 11 is a flowchart diagram for detaching the wireless communication device from a surface by command from an interrogation reader.

The wireless communication device 130 may be configured to alter the magnetic field 301 or magnetic flux 208 to detach from a magnetic surface portion 162 on receipt of communication or command. This process is illustrated in the flow chart in FIG. 11. The process starts (block 400), and a transmission by a transmitter or interrogation reader 100 communicates a message to the wireless communication electronics 132 (block 402). The wireless communication electronics 132 decodes the message and sends it to the control system 134 as previously discussed (block 404). The control system 134 determines if the command is to detach the wireless communication device 130 (decision 406). If the command is to detach, the control system 134 alters the magnetic field 301 or magnetic flux 208 (block 408) as appropriate and the process ends (block 410). If the command is not to detach, the process ends (block 410). This process may be used to alter the magnetic field 301 or magnetic flux 208 for the present invention, including any of the embodiments previously described.

The control system 134, upon receiving a command to detach, may use energy from the power source 140 to release the latch 250. If a magnetic latch 250 is used as previously described in FIGS. 5A and 5B, the control system 134 could generate a magnetic field 301 by generating a voltage across a coil 300 wound around a core 302 (as previously discussed and shown in FIG. 9) to generate a magnetic field 301 in proximity to magnetic latch 250. The magnetic field 301 causes the magnetic latch 250 to release, thereby causing the housing 201 containing the magnet 200 to rotate. The magnetic field 301 required to be generated by the wireless communication device 130 using a power source 140 to release the magnetic latch 250 may be of less strength than needed to cancel the magnetic flux 208, thereby allowing the wireless communication device 130 to conserve energy in its power source 140.

Another type of latch 250 that can be released when the wireless communication device 130 receives a command to detach is a mechanical resonator as discussed previously. The wireless communication device 130 generates a resonate frequency in proximate to the mechanical resonator by using its power source 140 to power a frequency generator 142. The frequency generator 142 generates a frequency that is the resonate frequency of the mechanical resonator.

A piezoelectric device, like that described in U.S. Pat. No. 5,552,655 entitled "Low frequency mechanical resonator,"

incorporated herein by reference in its entirety, could be used to release the latch 250 described above and in FIGS. 5A and 5B. The piezoelectric device receives an electrical signal from the control system 134 and converts such energy into a mechanical movement to move the latch 250 away from the notch 256. When the wireless communication device 130 receives a command to detach, the control system 134 controls the power source 140 to send power to the piezoelectric device to release the latch 250, altering the magnetic flux 208 to cause an attraction sufficient for the wireless communication device 130 to attach to the magnetic surface portion 162.

The power source 140 may also be used to provide energy to activate the latch 250 when a particular frequency is detected by a frequency detector 144 in the wireless communication device 130. The control system 134 uses a frequency generator 142 to emit the desired frequency to be detected by the frequency detector 144 to detach the wireless communication device 130. The frequency detector 142, for example, may be an alternating current magnetic field to produce a voltage to activate a switch such as a comparator or transistor configuration. An electromagnet could also be used that is contained in the wireless communication device 130 to pick up a particular frequency. If the wireless communication device 130 already has an electromagnet coil 300 that is used to create the attraction magnetic force between the wireless communication device 130 and the magnetic surface portion 162 (discussed above and shown in FIG. 9), this same electromagnet can be used as the frequency detector 144 as well. The electromagnet detects a particular frequency, such as an alterative current field, to produce a voltage thereby activating a switch, such as a comparator, transistor configuration or piezoelectric switch, to release the latch 250.

The wireless communication device 130 may be located in different manners in the present invention. The wireless communication device 130 may be located in the pole pieces 204 as shown in FIGS. 5A and 5B. The purpose of this is to allow the wireless communication device 130 to determine the state of the magnetic flux 208 or magnetic field 301 by use of a magnetic detector, frequency detector 144 or other device to determine if it is attached to a magnetic surface portion 162. For instance, for the embodiment shown in FIGS. 5A and 5B, if the wireless communication device 130 detects that the magnetic flux 208 is in the gap 206, this indicates that the wireless communication device 130 could not be attached to a magnetic surface portion 162. If the wireless communication device 130 sensed the magnetic flux 208, this would indicate that the wireless communication device 130 could be attached to a magnetic surface portion 162. It may also be desirable to locate two wireless communication devices 130 in the pole pieces 240, one near the slot 206 and one in the pole pieces 204 that would not sense magnetic flux in the slot 206. One of the wireless communication devices 130 would be able to sense the magnetic flux 208. If the wireless communication device 130 near the slot 206 senses the magnetic flux 208, this indicates that the wireless communication device 130 is detached. If the wireless communication device 130 away from the slot 206 senses the magnetic flux 208, this indicates that the wireless communication device 130 is attached. This allows a different identification when the wireless communication device 130 is in an attached or detached state. The wireless communication device 130 may have an identification stored in memory 138 that can be communicated so that an understanding of the attachment status can be ascertained.

The present invention may be used to automatically detach wireless communication devices 130 from articles 160 that move through a tracking or distribution facility as previously described and shown in FIG. 3. The wireless communication device 130 detaches from the magnetic surface portion 162 at a desired point during movement of the article 160. For instance, the detachment may occur at the last interrogation point 158. Either an external device or internal device and method to the wireless communication device 130 may be used at this point to detach the wireless communication device 130 automatically. The point desired for detachment only need contain a device, or send the appropriate communication to the wireless communication device 130, to alter the magnetic force. Any of the methods and devices described above for alerting the magnetic force, field or flux for detaching the wireless communication device 130 from the article 160 may be used.

The embodiments described in this application are representative of the invention and are not intended to limit the invention to any particular embodiment. One of ordinary skill in the art will recognize that there are many ways to create and alter magnetic forces such as magnetic flux or magnetic fields to create attraction and detach the wireless communication device in the present application from a surface. The term magnet encompasses a natural magnet, electromagnet, or other type of material that has a magnetic force associated with it. The term magnetic force is used to describe magnetic flux and/or magnetic field and these terms are used to describe different types of magnetic forces interchangeably. It should also be understood that the magnetic force may not be the only means of attaching a wireless communication device 130 to a magnetic surface portion 162. Other forms of force, such as mechanical force, may be used in conjunction with magnetic force. Use of a particular terms including the ones described above should not be used to limit the scope of the embodiments and the present application from what one of ordinary skill in the art would understand them to mean and their equivalents to be.

What is claimed is:

1. A device that magnetically attaches to a magnetic surface portion of an article, comprising:

a wireless communication device; and a magnet coupled to said wireless communication device wherein said magnet is located inside a chamber;

said magnet has a magnetic force that attaches said magnet to the magnetic surface portion of the article when in close proximity to the magnetic surface portion of the article;

said chamber comprises of two pole pieces forming a gap at two opposite ends.

2. The device of claim 1, wherein said wireless communication device is located in one of said pole pieces.

3. The device of claim 2, wherein said wireless communication device is located near said gap.

4. The device of claim 3, further comprising a second wireless communication device located in one of said pole pieces away from said gap.

5. The device of claim 2, wherein said wireless communication device is located away from said gap.

6. A device that magnetically attaches to a magnetic surface portion of an article, comprising:

a wireless communication device;

a magnet coupled to said wireless communication device wherein said magnet is located inside a chamber;

said magnet has a magnetic force that attaches said magnet to the magnetic surface portion of the article when in close proximity to the magnetic surface portion of the article; and a latch that rotates said magnet in said chamber in response to a particular signal field.

7. The device of claim 6, further comprising a spring coupled to said latch to release said latch when said spring resonates.

8. The device of claim 6, wherein said particular signal field is 60 Hertz.

9. The device of claim 6, further comprising a signal detector coupled to said latch to detect the particular signal field and release said latch in response thereto.

10. The device of claim 6, wherein said wireless communication device provides power to a piezoelectric device to release said latch.

11. A device that magnetically attaches to a magnetic surface portion of an article, comprising:

a wireless communication device; and a magnet coupled to said wireless communication device wherein said magnet is located inside a chamber;

said magnet has a magnetic force that attached said magnet to the magnetic surface portion of the article when in close proximity to the magnetic surface portion of the article;

said wireless communication device alters said magnetic force when said wireless communication device receives a message.

12. The device of claim 11 wherein said wireless communication device passes a current to an electromagnet to alter said magnetic force.

13. The device of claim 12, wherein said electromagnet is mounted in close proximity to said magnet.

14. The device of claim 11, wherein said wireless communication device activates a latch that rotates said magnet to alter said magnetic force.

15. A device that magnetically attaches to a magnetic surface portion of an article, comprising:

a wireless communication device; and a magnet coupled to said wireless communication device wherein said magnet is located inside a chamber;

said magnet has a magnetic force that attaches said magnet to the magnetic surface portion of the article when in close proximity to the magnetic surface portion of the article;

said magnet is comprised of at least one tab connected to said wireless communication device wherein said at least one tab also comprises an antenna for said wireless communication device.

16. The device of claim 15, wherein said at least one tab is a permanent magnet.

17. The device of claim 15, wherein said at least one tab is an electromagnet.

18. A device that magnetically attaches to magnetic surface portion of an article, comprising:

a wireless communication device; and a magnet coupled to said wireless communication device wherein said magnet is located inside a chamber;

said magnet has a magnetic force that attaches said magnet to the magnetic surface portion of the article when in close proximity to the magnetic surface portion of the article;

said magnet moves in said chamber in a plane substantially perpendicular to said magnetic surface portion in response to said magnetic force or an external magnetic force.

19. A system for identification of an article, comprising:

an article having a magnetic surface portion;

a wireless communication device; and a magnet coupled to said wireless communication device wherein said magnet is located inside a chamber;

said magnet has a magnetic force that attaches said magnet to the magnetic surface portion of the article when in close proximity to the magnetic surface portion of the article;

said chamber is comprised of two pole pieces forming a gap at two opposite ends.

20. The system of claim 19, wherein said wireless communication device is located in one of said pole pieces.

21. The system of claim 20, wherein said wireless communication device is located near said gap.

22. The system of claim 21, further comprising a second wireless communication device located in one of said pole pieces away from said gap.

23. The system of claim 20, wherein said wireless communication device is located away from said gap.

24. A device that magnetically attaches to a magnetic surface portion of an article, comprising:

a wireless communication device; and a magnet coupled to said wireless communication device wherein said magnet is located inside a chamber;

said magnet has a magnetic force that attaches said magnet to the magnetic surface portion of the article when in close proximity to the magnetic surface portion of the article;

said chamber has an open portion for an external device to be inserted inside said chamber proximate to said magnet wherein said external device is adapted to cause a short with said magnet to cause said magnet to reverse polarity.

25. The system of claim 24, wherein said external device is a magnetic short.

26. A system for identification of an article, comprising:

an article containing having a magnetic surface portion;

a wireless communication device;

a magnet coupled to said wireless communication device wherein said magnet uses magnetic force to attach said wireless communication device to said magnetic surface portion of said article when in close proximity to said magnetic surface portion, wherein said magnet is housed and rotates in a magnetic assembly; and a latch that rotates said magnet in response to particular signal field.

27. The system of claim 26, further comprising a spring coupled to said latch to release said latch when said spring resonates.

28. The system of claim 26, wherein said particular signal field is 60 Hertz.

29. The system of claim 26, wherein said wireless communication device provides power to an piezoelectric device to release said latch.

30. The system of claim 26, further comprising a signal detector coupled to said latch to detect the particular signal field and release said latch in resonant thereto.

31. A system for identification of an article, comprising:

an article containing having a magnetic surface portion;

a wireless communication device;

a magnet coupled to said wireless communication device wherein said magnet uses magnetic force to attach said wireless communication device to said magnetic surface portion of said article when in close proximity to said magnetic surface portion; and said wireless communication device alters said magnetic force when said wireless communication device receives a message through said wireless communication device.

32. The system of claim 31, wherein said wireless communication device passes a current to an electromagnet to alter said magnetic force.

33. The system of claim 32, wherein said electromagnet is mounted in close proximity to said magnet.

34. The system of claim 31, wherein said wireless communication device activates a latch that rotates said magnet to alter said magnetic force.

35. A system for identification of an article, comprising:

an article containing a magnetic surface portion;

a wireless communication device; and a magnet coupled to said wireless communication device wherein said magnet uses magnetic force to attach said wireless communication device to said magnetic surface portion of said article when in close proximity to said magnetic surface portion;

said magnet is comprised of at least one tab connected to said wireless communication device wherein said at least one tab also comprises an antenna for said wireless communication device.

36. The system of claim 35, wherein said at least one tab is a permanent magnet.

37. The system of claim 35, wherein said at least one tab is an electromagnet.

38. A method of detaching a wireless communication device from a magnetic surface portion wherein, the wireless communication device contains a magnet that attaches the wireless communication device to the magnetic surface portion by a magnetic force, comprising the step of activating a latch coupled to said magnet thereby rotating said magnet and altering said magnetic force, wherein activating a latch is comprised of bringing said wireless communication device in proximity to a signal field generator.

39. The method of claim 38, wherein bringing said wireless communication device in proximity to a signal field generator step resonates a spring coupled to said latch.

40. A method of detaching a wireless communication device from a magnetic surface portion, wherein the wireless commutation device contains a magnet that attaches the wireless communication device to magnetic surface portion by a magnetic force, comprised of altering said magnetic force, which comprises of magnetically shorting said magnet.

41. A method of detaching a wireless communication device from a magnetic surface portion, wherein the wireless communication device contains a magnet that attaches the wireless communication device to the magnetic surface portion by a magnetic force, comprised of altering said magnetic force and communicating via the wireless communication device the attachment status of said wireless communication device.

42. A method of detaching a wireless communication device from a magnetic surface portion, wherein the wireless communication device contains a magnet that attaches the wireless communication device to the magnetic surface portion by a magnetic force, comprising the steps of:

receiving a message by said wireless communication device; and altering said magnetic force in response to said receiving said message.

43. The method of claim 42, wherein said magnet is an electromagnet.

44. The method of claim 43, wherein said electromagnet is comprised of a coil around a magnetic surface portion and said wireless communication device provides a voltage across said coil.

45. The method of claim 44, wherein said voltage is generated by an energy source comprised from the group consisting of a reservoir capacitor and a battery.

46. The method of claim 42, further comprising powering an electromagnet in proximity to said magnet.

47. The method of claim 42, further comprising activating a latch coupled to said magnet to rotate said magnet.

*48. A device that magnetically attaches to a magnetic surface portion of an article, comprising:*

*a wireless communication device;*

*a magnet coupled to said wireless communication device wherein said magnet is located in a magnetic assembly, wherein said magnet has a magnetic force that attaches said magnet to the magnetic surface portion of the article when in close proximity to the magnetic surface portion of the article; and*

*a latch that rotates said magnet in said magnetic assembly in response to a particular signal field.*

*49. The device of claim 48, further comprising a spring coupled to said latch to release said latch when said spring resonates.*

*50. The device of claim 48, wherein said particular signal field is 60 Hertz.*

*51. The device of claim 48, further comprising a signal detector coupled to said latch to detect the particular signal field and release said latch in response thereto.*

*52. The device of claim 48, wherein said wireless communication device provides power to a piezoelectric device to release said latch.*

*53. A device that magnetically attaches to a magnetic surface portion of an article, comprising:*

*a wireless communication device; and*

*a magnet coupled to said wireless communication device;*

*wherein said magnet has a magnetic force that attaches said magnet to the magnetic surface portion of the article when in close proximity to the magnetic surface portion of the article, and*

*wherein said wireless communication device alters said magnetic force when said wireless communication device receives a message.*

*54. The device of claim 53 wherein said wireless communication device passes a current to an electromagnet to alter said magnetic force.*

*55. The device of claim 54, wherein said electromagnet is mounted in close proximity to said magnet.*

*56. The device of claim 53, wherein said wireless communication device activates a latch that rotates said magnet to alter said magnetic force.*

*57. A device that magnetically attaches to a magnetic surface portion of an article, comprising:*

*a wireless communication device; and*

*a magnet coupled to said wireless communication device,*

*wherein said magnet has a magnetic force that attaches said magnet to the magnetic surface portion of the article when in close proximity to the magnetic surface portion of the article, and*

*wherein said magnet is comprised of at least one tab connected to said wireless communication device, wherein said at least one tab also comprises an antenna for said wireless communication device.*

*58. The device of claim 57, wherein said at least one tab is a permanent magnet.*

*59. The device of claim 57, wherein said at least one tab is an electromagnet.*

* * * * *